(12) United States Patent
Ellis et al.

(10) Patent No.: US 9,846,743 B2
(45) Date of Patent: Dec. 19, 2017

(54) SYSTEMS, METHODS, AND INTERFACES FOR ANALYZING WEBPAGE PORTIONS

(75) Inventors: Kenneth Alexander Ellis, Basking Ridge, NJ (US); Linda Birbara, New York, NY (US); Thomas Tague, Concord, MA (US)

(73) Assignee: Thomson Reuters Global Resources Unlimited Company, Baar (CH)

( * ) Notice: Subject to any disclaimer, the term of this patent is extended or adjusted under 35 U.S.C. 154(b) by 473 days.

(21) Appl. No.: 13/224,609

(22) Filed: Sep. 2, 2011

(65) Prior Publication Data
US 2013/0060930 A1    Mar. 7, 2013

(51) Int. Cl.
G06F 15/173    (2006.01)
G06F 17/30    (2006.01)
G06Q 30/02    (2012.01)

(52) U.S. Cl.
CPC ....... *G06F 17/30864* (2013.01); *G06Q 30/02* (2013.01)

(58) Field of Classification Search
CPC .............. G06Q 30/02; H04N 21/4782; G06F 17/30867; G06F 17/3089; G06F 17/30997; G06F 17/30864
USPC .......................... 709/203, 217, 219, 223–224
See application file for complete search history.

(56) References Cited

U.S. PATENT DOCUMENTS

| | | | |
|---|---|---|---|
| 6,718,363 B1* | 4/2004 | Ponte ............................ 709/203 |
| 8,156,240 B2* | 4/2012 | Silberstein et al. .......... 709/232 |
| 8,250,474 B2* | 8/2012 | Peters ............... G06F 17/30044 707/714 |
| 8,458,584 B1* | 6/2013 | Wilson et al. ................. 715/234 |
| 8,707,312 B1* | 4/2014 | Zhu .................... G06F 17/30864 718/102 |
| 2006/0123330 A1* | 6/2006 | Horiuchi et al. ............. 715/500 |
| 2008/0065737 A1* | 3/2008 | Burke et al. .................. 709/217 |
| 2008/0065759 A1* | 3/2008 | Gassewitz et al. ........... 709/224 |
| 2008/0235368 A1* | 9/2008 | Nagaraj et al. ............... 709/224 |
| 2009/0204478 A1* | 8/2009 | Kaib et al. ........................ 705/10 |
| 2009/0259927 A1* | 10/2009 | Fisher ............... G06F 17/30864 715/205 |
| 2009/0319481 A1* | 12/2009 | Chitrapura et al. ............... 707/3 |
| 2010/0325168 A1* | 12/2010 | Luth et al. .................... 707/802 |
| 2011/0087545 A1* | 4/2011 | Gross ......................... 705/14.49 |
| 2011/0125593 A1* | 5/2011 | Wright et al. ............. 705/14.73 |
| 2011/0138267 A1* | 6/2011 | Yi et al. ......................... 715/234 |
| 2011/0202827 A1* | 8/2011 | Freishtat et al. .............. 715/234 |

(Continued)

*Primary Examiner* — Oanh Duong

(57) ABSTRACT

A method includes aggregating a set of analyzed webpage portions from at least two unaffiliated websites. The method also includes transmitting an aggregated result, the aggregated result associated with an aggregated set of analyzed webpage portions. Another embodiment includes the set of analyzed webpage portions being associated with a topic. Yet another embodiment includes receiving an indication of an occurrence of a browser event and analyzing, in response to receiving the indication, a webpage portion then storing an analyzed webpage portion and the browser event in a database. Yet another embodiment includes analyzing the webpage portion by downloading a webpage portion from at least one website, extracting a text portion from the webpage portion and associating, in response to extracting the text portion, at least one topic from the text portion.

16 Claims, 6 Drawing Sheets

(56) References Cited

U.S. PATENT DOCUMENTS

2011/0225115 A1\* 9/2011 Moitra .............. G06F 17/30864
                                                    706/50
2011/0314091 A1\* 12/2011 Podjarny ....................... 709/203
2013/0036344 A1\* 2/2013 Ahmed et al. ................ 715/205

\* cited by examiner

500

| Search Query | Global Frequency | My Referrers | Change |
|---|---|---|---|
| new cia appointment | 0.35% | 2051 | -5% |
| fire new mexico | 0.34% | 1428 | -5% |
| greece | 0.33% | 3090 | -5% |
| greek default | 0.32% | 5940 | -5% |

| Topic Group | Global Reach | My Pageviews | Change |
|---|---|---|---|
| Barack Obama, CIA, Robert Gates, Afghanistan, Politics | 4.3% | 205431 | -5% |
| Natural disaster, New Mexico, Los Alamos, forest fire | 3.8% | 142358 | -5% |
| Greece, finance, Georges Papandreou | 3.5% | 309400 | -5% |
| The Beatles, White Album, Apple Inc. | 3.4% | 0 | -5% |

FIGURE 6

SYSTEMS, METHODS, AND INTERFACES FOR ANALYZING WEBPAGE PORTIONS

COPYRIGHT NOTICE AND PERMISSION

A portion of this patent document contains material subject to copyright protection. The copyright owner has no objection to the facsimile reproduction by anyone of the patent document or the patent disclosure, as it appears in the Patent and Trademark Office patent files or records, but otherwise reserves all copyrights whatsoever. The following notice applies to this document: Copyright©2011 Thomson Reuters.

TECHNICAL FIELD

Various embodiments of the present invention concern systems, methods and interfaces for analyzing and aggregating webpage portions, particularly when the webpage portions span across unaffiliated websites.

BACKGROUND

Every day millions of consumers flock to the internet to keep current on the latest happenings worldwide. Since the internet is a vast portal of information, consumers have a plethora of information provider choices. These choices may include blogs, tweets, emails, websites, etc. Regardless of the venue in which the consumer chooses to consume this information, one common theme remains—the consumer wants trusted, up-to-date information on the topics that are relevant to him/her. Thus, consumers tend to gravitate towards websites that provide them with trusted, researched information regarding their topic. For example, if consumers want information on the forest fires in California, it is likely they would navigate to a trusted news website like Reuters.com instead of going to an online social tabloid website to consume this information.

In order to retain a consumer, the publisher needs to know what topics the consumer wants in a timely manner. Otherwise, the consumer may navigate away from the website. The increase and/or decrease of consumer navigation to a publisher's website can have a direct affect on the publisher's revenue stream. For example, if consumers are realizing that the information on publisher A's website is not up-to-date or relevant to the current events, they will choose to visit a different website for their information. In turn, advertisers that purchased space on the publisher A's website may choose not to renew their contracts because of lower consumer traffic numbers than expected. Thus, as consumer traffic decreases, more than likely so will the advertising revenue and overall publisher revenue. Therefore, a publisher needs to have the resources to recognize when a topic needs more or less coverage based on consumers' navigation. In addition, a publisher may want to know how its topic coverage compares to other unaffiliated websites.

Currently, a known approach to reporting the above mentioned information to a publisher includes reporting webpage/website consumption for a single, publisher-specific website. When website content is accessed, the website URL and a unique identifier for the consumer accessing the website are collected. This information is then gathered and analyzed to provide the publisher with an idea of what topics interest its consumers. For example, some systems can track the consumer's navigation through the publisher's website. The system could tell the publisher that consumer A is currently interested in a topic associated with or representing the Chilean mine disaster because consumer A has visited publisher's website every 30 minutes to see if there is an update on this topic. The known system can then gather that information along with information from other consumers to aggregate and report consumption information to the publisher about the publisher's website. However, there are severe disadvantages to the known approach.

SUMMARY

We have discovered the need to aggregate website consumption information across unaffiliated websites. More specifically, for example, a publisher's current consumer base may be interested in the Chilean mine disaster. However, if there is a trending topic on which the publisher has not yet reported, a publisher may lose revenue because that might be of benefit to its current consumers or might benefit a new consumer base that the publisher has been trying to attract. Without this capability a publisher could lose potential revenue by not seeing the overall topic trending information that only an analysis across multiple, unaffiliated websites can provide.

The inventor has recognized the necessity for additional improvements in analyzing webpage portions across unaffiliated websites, particularly aggregating a set of analyzed webpage portions from at least two unaffiliated websites and transmitting an aggregated result where the aggregated result is associated with an aggregated set of analyzed webpage portions.

Advantageously, the invention allows for the collecting, aggregating, and/or comparing of webpage consumption information across a collection of unaffiliated websites, each of which may represent an individual client/user contracted with e.g., Thomson Reuters, to provide webpage consumption reports. Webpage consumption may be provided at a topical level for each website, rather than on the level of individual URLs, thereby allowing webpage consumption information to be aggregated and reported across unaffiliated websites. With that advantage in mind, the invention allows for receiving an indication of an occurrence of a browser event, analyzing a webpage portion and determining a topic from a portion of webpage text.

Advantageously, the invention permits a user (e.g., an employee of a publisher) to compare a set of publisher specific results to the results of all the publishers through the comparison of multiple webpage portions. Based on the comparison of the results, a publisher makes a more educated decision on what topics and/or content to present to pique consumers' interest.

Exemplary use cases for the system, methods and interfaces described herein include:

1) A use case for content demand estimation for publisher A based on identifying publisher A's consumers and the topical consumption history of those consumers to other unaffiliated websites. For example, publisher A's consumers may tend to also read news about World Cup Soccer via other unaffiliated websites. This use case may be used to help the publisher in planning coverage and new sections.

2) A use case for estimation of readership share for consumers to a website. For example, for consumers that visit publisher A more than 5 times per month, publisher A accounts for 80% of their financial news consumption among monitored sites. This use case may be used in content planning, site design, and/or to help establish favorable advertising rates.

3) A use case for content personalization based on the recent topical consumption history of a consumer. For example, a consumer who has accessed news content on the Chilean mine disaster 15 times in the last 24 hours may be shown the latest content about the Chilean mine disaster. In another example, consumers who consume primarily financial news may be shown the latest financial news or stock tickers. This use case may be used to help reader engagement and ultimately increase traffic to a website.

4) A use case for reports on global or publisher-specific traffic, broken down by geography, consumer demographics, or by a publisher or consumer segmentation algorithm. For example, information is provided to answer the following questions: A) "What news topics are in demand for a publisher's core consumers (more than N visits in the last 30 days) or for North American consumers?" B) "What are the top search queries for domains (i.e., GOOGLE® and BING®)?" C) "How popular is the search term 'Japan' over the last 3 hours?" This use case may be used in content planning and/or to help establish favorable advertising rates.

BRIEF DESCRIPTION OF THE DRAWINGS

FIG. 5 is an exemplary interface 500 which corresponds to one or more embodiments of the invention.

FIG. 6 is an exemplary interface 600 which corresponds to one or more embodiments of the invention.

DETAILED DESCRIPTION OF THE EXEMPLARY EMBODIMENT(S)

The description includes many terms with meanings derived from their usage in the art or from their use within the context of the description. However, as a further aid, the following examples are presented. The term "content" or "data" includes, but is not limited to, content, information, events, metadata and relationships relating to websites. Types of content include, but are not limited to, media, news, financial, legal, scientific, healthcare and tax/accounting. Exemplary content, information, events and metadata are browser events, consumer search queries, a webpage portion, an analyzed webpage portion, a topic, and/or a set of relationships between the metadata, the browser event and the webpage portion. Exemplary browser events include, but are not limited to, a consumer opening a webpage by typing a webpage URL in an address bar, a consumer clicking on a link that opens a new webpage, a consumer clicking on a link that causes some action (i.e., start multimedia file, display article or activate ADOBE® FLASH®) on the page that exposes the consumer to new content and/or a browser automatically initiating exposure to new content (e.g., automatically advances a photo gallery). The term "topic" is the subject or theme from a webpage portion. The term "webpage portion" is any portion of a webpage such as text, picture, graph, audio file, video file, any multimedia file and/or any combination thereof. The term "analyzed webpage portion" is a webpage portion that has been analyzed using method steps 204a-c. The term "aggregated set of analyzed webpage portions" is at least two analyzed webpage portions that are aggregated into an aggregated set. The term "aggregated result" is a result associated with an aggregated set of analyzed webpage portions. The term "comparison result" is a result associated with an aggregated first set of analyzed webpage portions and an aggregated second set of analyzed webpage portions. Most of the metadata is publisher-specific such as access device identifier, a byline, a webpage title, a publisher-defined section name, a webpage uniform resource locator (URL), a webpage title, an account identifier, and a consumer navigation tracker. Metadata that may be considered anonymous (cannot be related back to a specific publisher) includes topics that are extracted from a portion of webpage text. The term "consumer" refers to an individual that consumes website information. For example, a consumer for a publisher is an individual that consumes information on the publisher's website. Consequently, a publisher may track a consumer's navigation habits throughout the publisher's website (i.e., consumer navigation tracker). The term "publisher" refers to an entity that publishes content on the internet. The term "user" refers to an individual that is accessing and using the system 100, methods 200 and 300 and interfaces 400-600. In some embodiments, a user may be a person employed by a publisher.

Exemplary System

Figure 1:
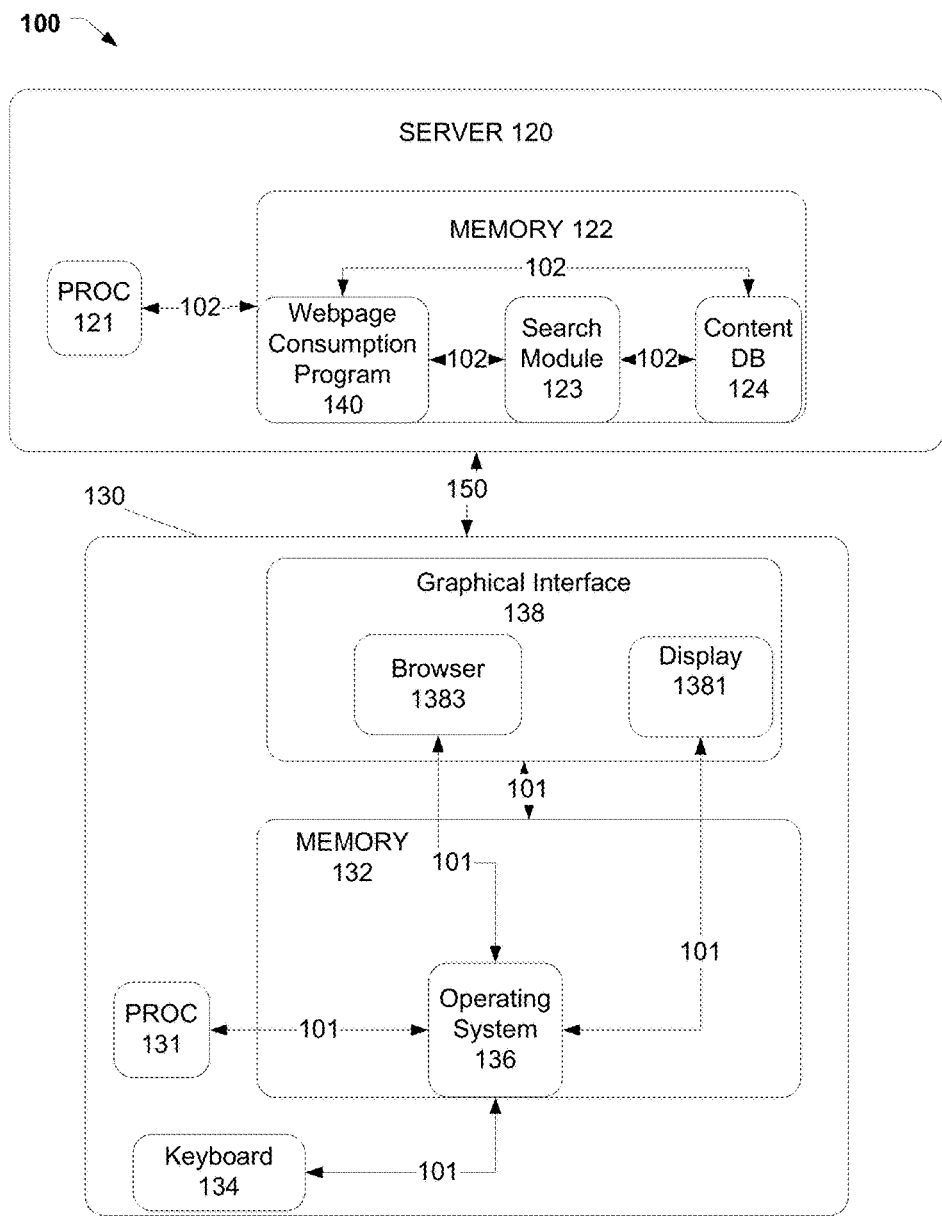
FIG. 1 is an exemplary system 100 which corresponds to one or more embodiments of the invention.

FIG. 1 shows an exemplary system 100, which may be adapted to incorporate the capabilities, functions, methods, and interfaces of the present invention. System 100 includes a server 120 and an access device 130.

Server 120 is generally representative of one or more servers for serving data in the form of a webpage or other markup language with associated applets, ActiveX controls, and/or other related software and data structures. In addition, server 120 transmits a signal via a wireless or wireline transmission channel 150 to at least one access device, such as access device 130. For example, a signal transmission channel 150 may be associated with a request to display a comparison result to access device 130. Server 120 includes a processor 121 and a memory 122, wherein the memory 122 further includes a search module 123, a content database 124 and a webpage consumption program 140. All of these elements are connected via computer bus 102, which is shown in various pathways throughout the server 120. Computer buses 101 and/or 102 are subsystems that transfer data between the access device's components/elements and/or between multiple access devices 130.

Processor 121 includes one or more local and/or distributed processors, controllers and/or virtual machines. In the exemplary embodiment, processor module 121 takes any convenient and/or desirable form known to those skilled in the art. Memory 122 takes the exemplary form of one or more electronic, magnetic, and/or optical data-storage devices and stores a search module 123, a content database 124 and a webpage consumption program 140.

Search module 123 includes one or more search engines and related user-interface components (not shown), for receiving and processing queries against content database 124. Content database 124 takes the exemplary form of one or more electronic, magnetic, and/or optical data-storage devices. Content database 124 includes content and/or data relating to websites.

In some embodiments, a contractual relationship is established between the publisher of the website (i.e., a third party) and an entity that executes the systems, methods and interfaces described herein. That relationship allows the entity to collect, anonymize and share data from the publisher's website. For example, Publisher X allows Company Z to track consumer navigation on its website A. Company Z also tracks consumer navigation for several other publishers. These publishers are considered an exemplary plurality of third parties. Each third party does not necessarily have to establish a contract to be considered an exemplary third party. Additional examples of plurality of third parties and/or individual third parties are mentioned herein. Referring back to the example, after collecting the data from each publisher, Company Z strips the publisher-specific metadata before the data is shared between all the contractual publishers (i.e., another exemplary plurality of third parties). This allows all contractual publishers to query and receive information, via search module 123, without divulging the source of the information. Access to server 120, the content database 124, and the webpage consumption program 140 is provided once a set of user credentials are authenticated. For instance, user credentials may be a user name and associated password. Once the credentials are successfully authenticated on server 120, the signal is transmitted via a wireless or wireline transmission channel 150 to access device 130 and access is granted to the server 120, the content database 124, and the webpage consumption program 140. For purposes described herein, successfully authenticating a set of user credentials means the user credentials were accepted by an authentication system (not shown but well known to those skilled in the art). This successful authentication allows for receiving and/or transmitting information (e.g., results) from server 120 to access device 130, particularly display 1381.

Access device 130 is generally representative of one or more access devices. In addition, access device 130 may be mobile or non-mobile. For example, a mobile and/or non-mobile access device may take the form of a personal computer, workstation, personal digital assistant, mobile telephone, smartphone, APPLE® iPad, and/or any other device capable of providing an effective user interface with a server and/or database. Specifically, in this exemplary embodiment, access device 130 is a mobile access device which includes a graphical interface 138, a processor module 131, a memory 132, and a keyboard 134. All of these elements are connected via computer bus 101, which is shown in various pathways throughout the access device 130.

Processor module 131 includes one or more processors, processing circuits, and/or controllers. In the exemplary embodiment, processor module 131 takes any convenient and/or desirable form known to those skilled in the art. Coupled, via computer bus 101, to processor module 131 is memory 132.

Memory 132 and hard drive (not shown) are examples of main memory and secondary memory, respectively. In this document, the terms "computer program medium," "computer usable medium," and "computer readable medium" may generally refer to media such as main memory, secondary memory, removable storage drive, a hard disk installed in a hard disk drive and/or other media well known to those skilled in the art. The computer readable medium, for example, may include non-volatile memory, such as a floppy disk, ROM, flash memory, disk drive memory, a CD-ROM, a CD-optical drive or disc and/or other permanent storage. Additionally, a computer readable medium may include, for example, volatile storage such as RAM, buffers, cache memory, and/or network circuits. The processor 131 reads data, instructions, messages or message packets, and other computer readable information from the computer readable medium.

In one exemplary embodiment, memory 132 stores code (machine-readable or executable instructions) for an operating system 136. Operating system 136 is coupled to graphical interface 138 and various other components, via computer bus 101. In the exemplary embodiment, operating system 136 takes the form of a version of the MICROSOFT® WINDOWS® operating system, and browser 1383 takes the form of a version of MICROSOFT® INTERNET EXPLORER®. In addition, operating system 136 interacts, via computer bus 101, with the keyboard 134, the processor 131. For example, the keyboard 134 sends inputs, via computer bus 101, to the operating system 136. The operating system 136 then determines the webpage consumption program 140 needs to be utilized, engages the webpage consumption program 140 through a signal via a wireless or wireline transmission channel 150, accepts the webpage consumption program output as data and stores that data temporarily in memory 132 (e.g., RAM). Operating system 136 and browser 1383 not only receive inputs from keyboard 134, but also support rendering of graphical user interfaces within graphical interface 138.

Graphical interface 138 includes a browser 1383 and a display 1381. When the webpage consumption program 140 is initiated, a display 1381 is defined in memory 132 and rendered on graphical interface 138. Upon rendering, the graphical interface 138 presents the data/results in association with the set of instructions from the webpage consumption program 140 as further discussed herein.

Figure 1A:
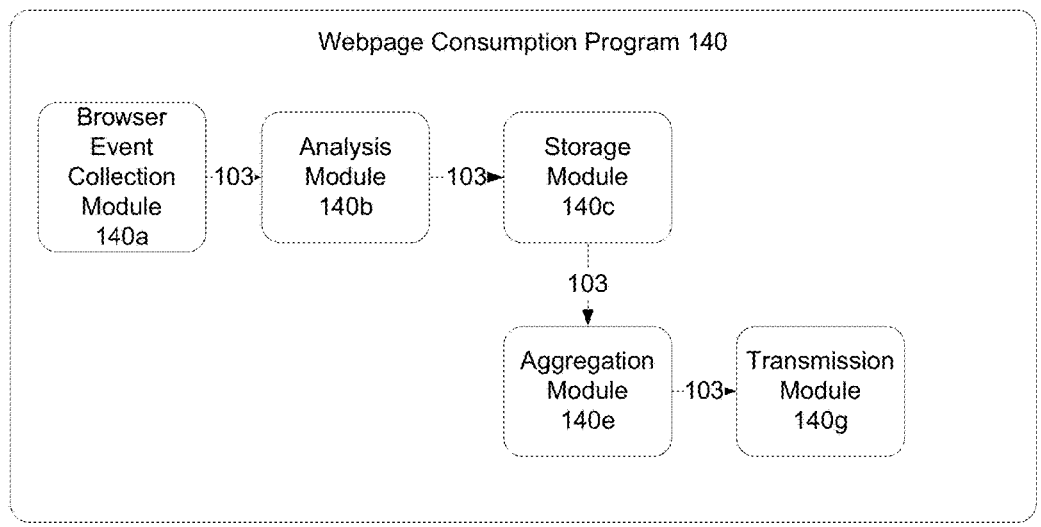
FIG. 1A is an exemplary webpage consumption program 140 which corresponds to one or more embodiments of the invention.

FIG. 1A illustrates an exemplary embodiment of a webpage consumption program 140. In some embodiments, the access device 130 may access the webpage consumption program 140 from server 120 through a signal via a wireless or wireline transmission channel 150. The webpage consumption program 140 is configured to execute a set of modules from memory 122. The modules include a browser event collection module 140a, an analysis module 140b, a storage module 140c, an aggregation module 140e and a transmission module 140g. Each module is described herein. The browser event collection module 140a is configured to receive an indication of an occurrence of a browser event. These browser events are tracked using various techniques known to those skilled in the art. For example, a tracking script accesses a consumer's access device and reports an indication of an occurrence of a browser event along with metadata to the webpage consumption module 140, particularly the browser event collection module 140a. In one example, a third party cookie can be used to track consumer navigation and, ultimately, browser events. Each example is discussed herein. A browser often requests resources from third party servers (such as advertising networks). These third party servers use third party cookies to track the consumer even if the consumer never visits the server directly. For example, if a consumer visits a website that contains content from a third party and then later visits another website that contains content from the same third party, the third party can track the consumer between the two sites. See "Third Party Cookies" http://tools.ietf.org/html/rfc6265#section-7.1.

After the browser event collection module 140a has executed as least once, the analysis module 140b is configured to analyze, in response to the indication of the occurrence to the browser event, a webpage portion associated with the browser event. The storage module 140c takes the exemplary form of one or more electronic, magnetic, and/or optical data-storage devices. In addition, the storage module 140c is configured to store an analyzed webpage portion and an indication of an occurrence of the browser event in the content database 124. The analyzed webpage portion is considered a webpage portion in the set of analyzed webpage portions. In some embodiments, other information such as metadata is stored in content database 124 along with the analyzed webpage portion and the indication of the occurrence of the browser event. For example, a webpage title is exemplary metadata that may be stored in content database 124 along with the analyzed webpage portion and the indication of the occurrence of the browser event. The aggregation module 140e is configured to aggregate a set of analyzed webpage portions that come from at least two unaffiliated websites. Two websites are said to be "unaffiliated" if they are not under common control. After the aggregation module 140e has completed execution, the transmission module 140g is configured to transmit information (e.g., a result, an aggregated result and/or a comparison result) to access device 130, particularly display 1381, through a signal via a wireless or wireline transmission channel 150.

Figure 1B:
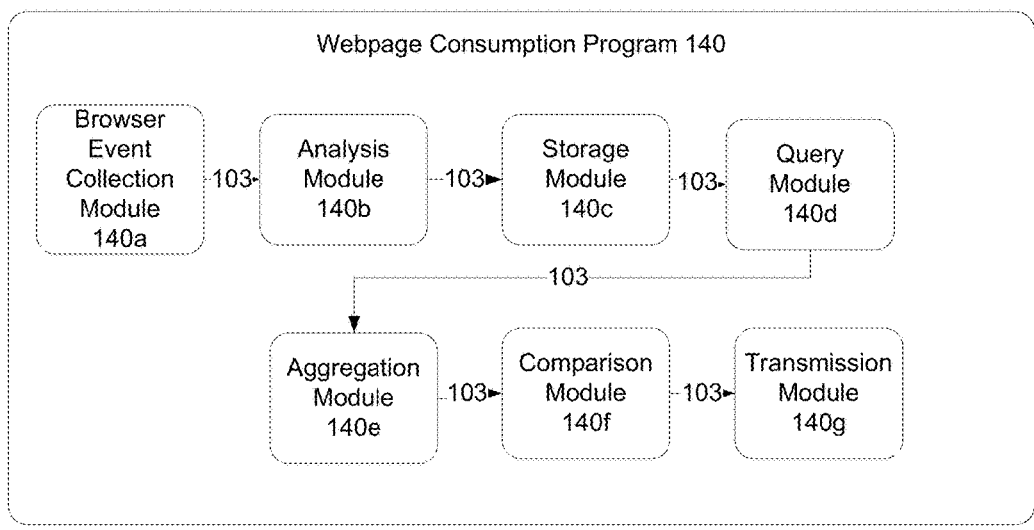
FIG. 1B is an exemplary webpage consumption program 140 which corresponds to one or more embodiments of the invention.

FIG. 1B illustrates another exemplary embodiment of a webpage consumption program 140. While the modules described above are incorporated into FIG. 1B, two additional modules exist: query module 140d and comparison module 140f. The two modules are described herein. Query module 140d is configured to receive a query. In some embodiments, the query comes from a user of system 100. Exemplary users include anyone who may benefit from the information system 100 provides such as those working in: publishing, advertising, sales, journalism, editorial and strategy. The comparison module 140f is configured to compare an aggregated first set of analyzed webpage portions and an aggregated second set of analyzed webpage portions.

Exemplary Methods as Conducted by System 100

Figure 2:
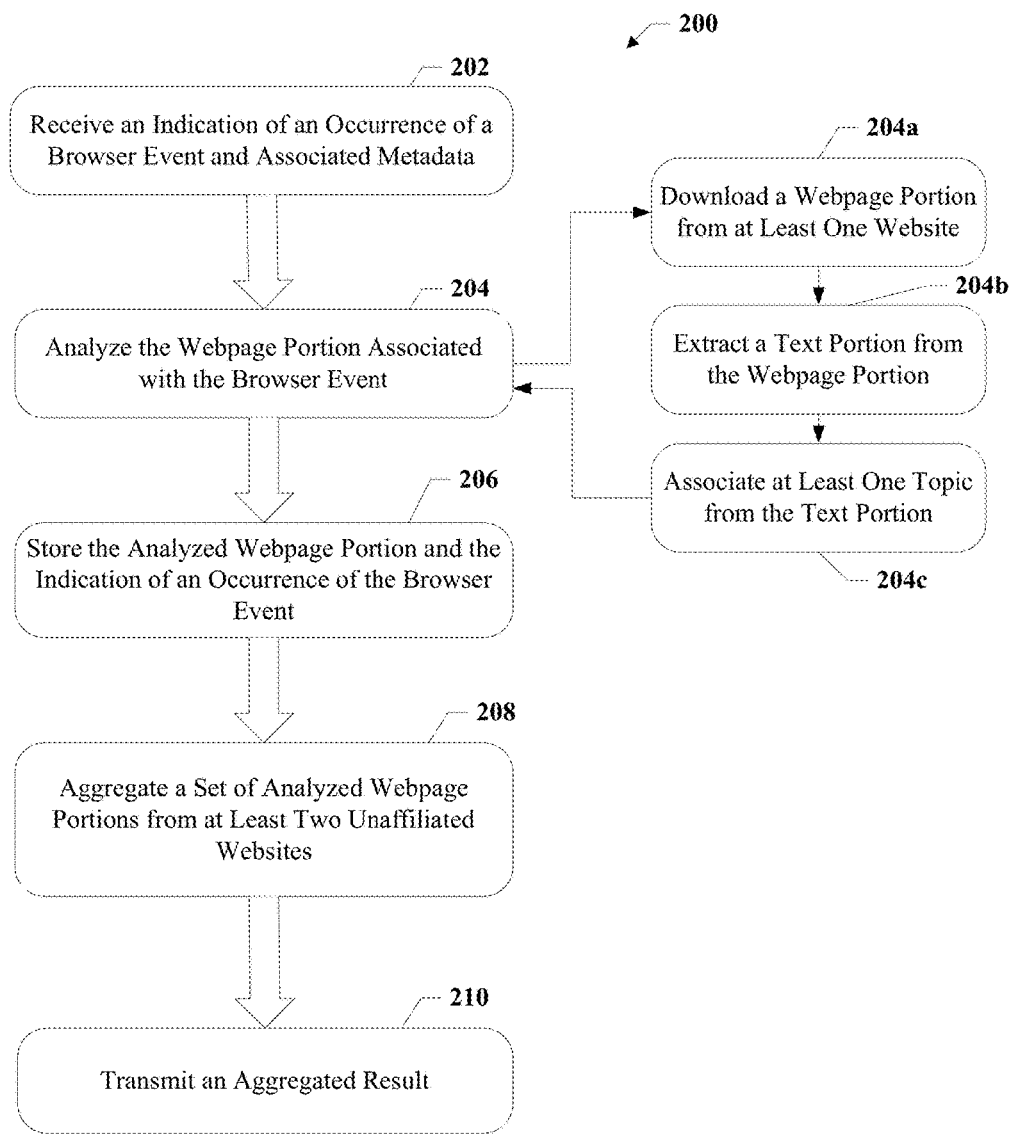
FIG. 2 is an exemplary method 200 which corresponds to one or more embodiments of the invention.
Figure 3:
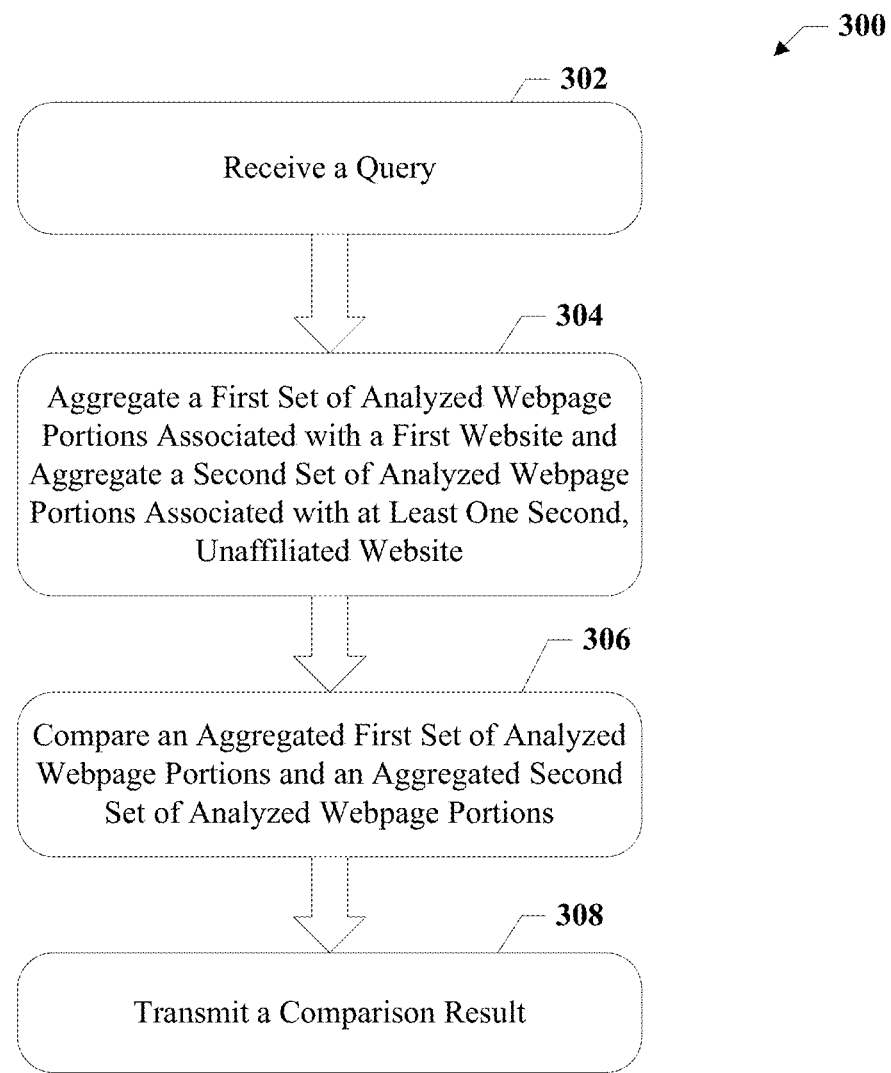
FIG. 3 is an exemplary method 300 which corresponds to one or more embodiments of the invention.

Referring now to FIGS. 2-3, system 100 is configured to implement methods 200 and 300. Method 200 includes functional blocks 202-210 and sub-blocks 204a-c. Method 300 includes functional blocks 302-308. Each method is described herein. These functional blocks are steps that perform actions including assignments, decisions, assessments and other like functions.

With respect to FIG. 2, in step 202, the webpage consumption program 140 receives an indication of an occurrence of a browser event and associated metadata, particularly a webpage URL. As mentioned above, the browser event is usually a consumer initiated event or in some cases an automatic event. Once the indication of an occurrence of browser event is received, the browser event collection module 140a scans the webpage URL and determines if the webpage URL should be downloaded for analysis. Factors that are considered when determining if a webpage URL should be downloaded include length of text, amount of text, ratio of text to multimedia files, and/or continuity of the text. Put another way, one asks is there enough text to support a topic extraction on that text? If the answer is yes or if the factors have been weighed in favor of downloading the webpage URL, then another determination is needed as to whether this webpage URL has been previously processed. If the webpage URL has already been processed within a given timeframe (e.g., seconds, minutes, hours, days, weeks), that analyzed webpage (i.e., analyzed webpage portion) is retrieved from the content database 124 and transmitted and displayed to the user. This checkpoint can save the system 100 a significant amount of processing time if it does not need to process a webpage URL. This creates a great advantage to be able to produce an accurate and almost "real-time" result to the user. If the webpage URL has not been previously processed, the process and the webpage URL moves to step 204.

In step 204, the webpage URL is analyzed. In particular a webpage portion that is associated with a browser event is analyzed. The analysis steps are further described in sub-steps 204a-204c. In sub-step 204a, a webpage portion is downloaded from a website. Due to the contractual relationship in some exemplary embodiments, the webpage portions are downloaded and analyzed with permission. Once a webpage portion is downloaded, the process moves to sub-step 204b. In step sub-204b, a text portion is extracted from the webpage portion. For example, in a news article, the headline and body text may be extracted using techniques known to those skilled in the art. After the text portion is extracted, sub-step 204c takes the text portion and associates the text portion with at least one topic. Note there may be more than one topic associated with one text portion. For example, a news article (i.e., a text portion) discusses the decrease in U.S. gas prices and the affect that has on other countries and their economies. The two topics associated with the news article may be 1) U.S. gas price decrease and 2) non-U.S. countries and their economies. In one embodiment, the determination step may use systems, methods described in the following U.S. Patents: U.S. Pat. No. 6,442,545; U.S. Pat. No. 6,532,469; U.S. Pat. No. 7,570,262; U.S. Pat. No. 7,907,140 (each are herein incorporated by reference) and/or co-occurrence methods (the frequent occurrence of two terms from a text corpus alongside each other in a certain order) to determine topics with a text portion. Other embodiments of topical association are known to those skilled in the art. The text portion where a topical association has been made is considered an exemplary analyzed webpage portion. In the previous example, the text describing the U.S. gas price decrease and the text describing the non-U.S. countries and their economies are each exemplary analyzed webpage portions. In addition, all topics associated with the text portion are determined before completing step 204 and proceeding to the step 206. After the association sub-step 204c, the analysis step 204 has concluded and the process continues to step 206.

In step 206, the analyzed webpage portion is stored in the content database 124 along with the indication of the occurrence of the browser event and/or any other metadata, information relating to the webpage, webpage portion, and/or browser event. The relationships between this information are also stored within the content database 124. The analyzed webpage portion is considered a webpage portion in the set of analyzed webpage portions. Once the analyzed webpage portion and the indication of the occurrence of the browser event are stored in content database 124, the process advances to step 208.

In step 208, a set of analyzed webpage portions is aggregated from at least two unaffiliated websites. Having the set of analyzed webpage portions aggregate across at least two unaffiliated websites allows a user to receive a better quality result than if the webpage portion were only across a single website. In some embodiments, the set of analyzed webpage portions is associated with a topic (see sub-step 204c). Since in these embodiments each analyzed webpage portion and browser event is stored in relation or association to a topic, system 100, via method 200, enables effective and optimal aggregation of a set of analyzed webpage portions across unaffiliated websites. Once the aggregation step is complete, the process executes step 210.

In step 210, an aggregated result is transmitted from server 120 to an access device 130 through a signal via a wireless or wireline transmission channel 150. The aggregated result is then ultimately displayed to the user on display 1381. Display systems and interfaces are described herein and/or are known to those skilled in the art. In particular, reference FIGS. 4-6 for exemplary interfaces illustrating aggregated results.

Now turning to FIG. 3, in step 302, a query from a user is received from the access device 130 through a signal via a wireless or wireline transmission channel 150 to server 120, particularly the query module 140d. Once the user's query has been received, the process continues to step 304.

In step 304, a first set of analyzed webpage portions associated with a first website is aggregated and a second set of analyzed webpage portions associated with a second, unaffiliated website is aggregated. While this aggregation step 304 is similar to aggregation step 208, the distinction is, in step 304, the two sets of analyzed webpage portions need to remain separate so that the comparison step 306 can be executed. After the aggregation step is complete, the process advances to step 306.

In step 306, an aggregated first set of analyzed webpage portions is compared to an aggregated second set of analyzed webpage portions. In some embodiments, the aggregated first set of analyzed webpage portions is associated with a set of publisher-specific metadata and the aggregated second set of analyzed webpage portions associated with a set of anonymous metadata. Examples of publisher-specific metadata and anonymous metadata were previously described herein. A comparison allows a publisher to see its data compared/benchmarked to other publishers. For example, publisher A may see a trend of publisher A's traffic on topic X displayed in conjunction with another trend of all the publishers' traffic on topic X. As described earlier, there are various different use cases for what can happen when this information is analyzed, aggregated, compared and transmitted. Once the two aggregated sets of analyzed webpage portions are compared, the process proceeds to step 308.

In step 308, a comparison result is transmitted from server 120 to an access device 130 through a signal via a wireless or wireline transmission channel 150. The comparison result is a result associated with the aggregated first set of analyzed webpage portions and the aggregated second set of analyzed webpage portions. In particular, reference FIG. 4, the trend report 402 for an exemplary comparison result. The comparison result is then ultimately displayed to the user on display 1381. Display systems and interfaces are described herein and/or are known to those skilled in the art.

Exemplary Interfaces

Figure 4:
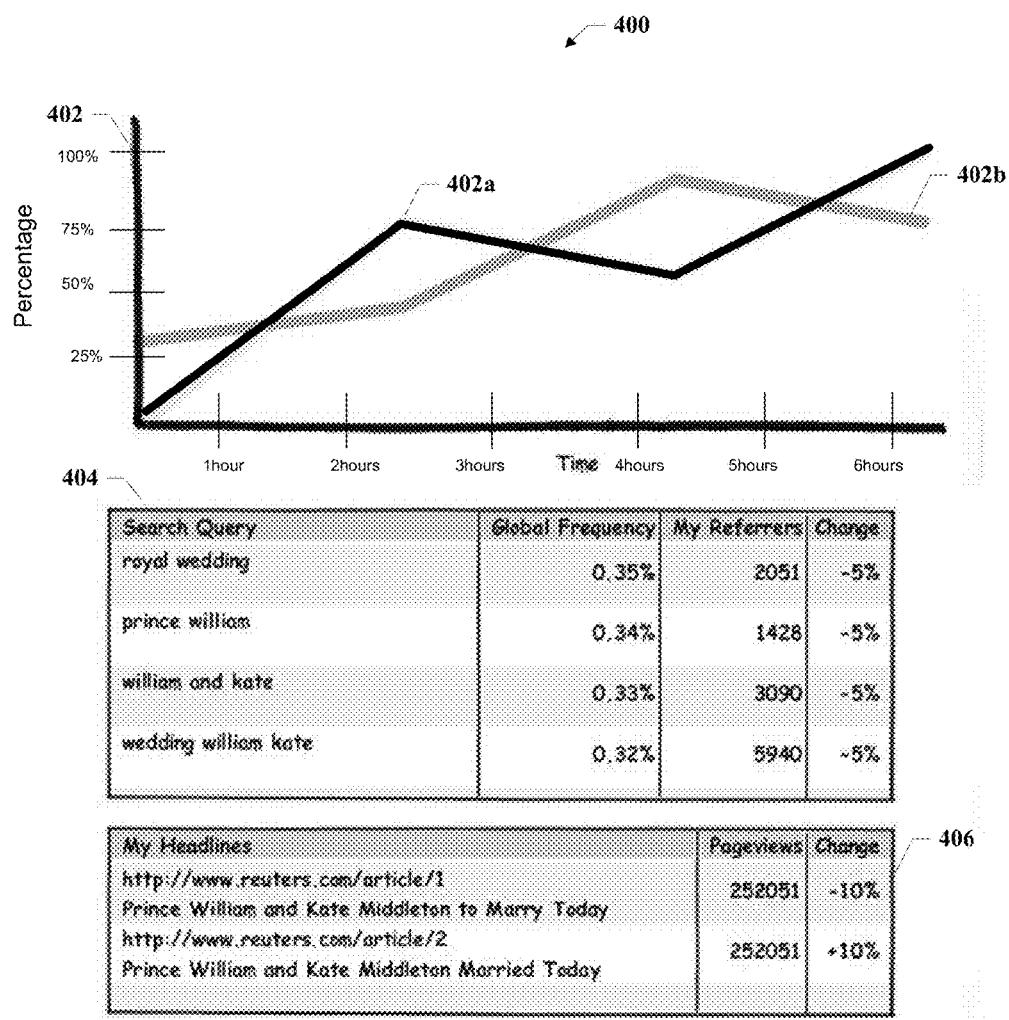
FIG. 4 is an exemplary interface 400 which corresponds to one or more embodiments of the invention.

FIGS. 4-6 show exemplary interfaces for system 100 and methods 200 and 300, which may be adapted to incorporate the capabilities, functions, systems and methods of the present invention.

FIG. 4 illustrates an exemplary display 1381 on an access device 130, for example, a laptop. This exemplary interface shows various results including an aggregated result and a comparison result for the topic of Prince William and Kate Middleton's Royal Wedding. These results could be initiated by a user query or by filtering through a list of topics (see FIG. 5). Either way, system 100 and methods 200 and 300 allow for the aggregating of analyzed webpage portions, possible comparison of the aggregated analyzed webpage portions and the transmission of results to display to the user. For example, trend report 402 represents a trend of percentage vs. a period of time. The publisher trend 402a represents the percentage of:

$$\frac{\left(\begin{array}{c}\text{Consumers That Have Been Exposed To The Topic}\\ \text{On The Current Publisher's Website}\end{array}\right)}{\left(\begin{array}{c}\text{Consumers That Have Been Exposed To The Topic}\\ \text{On All The Unaffiliated Websites}\end{array}\right)}$$

vs. a period of time (for example, the last 6 hours). An increase and/or a decrease in the publisher trend 402a indicate the percentage of consumers being exposed to the topic on the current publisher's website increasing and/or decreasing respectively over a period of time. The global reach trend 402b represents the percentage of consumers that have been exposed to the topic on all the unaffiliated websites vs. the same period of time as the publisher trend 402a. An increase and/or a decrease in the global trend 402b indicate the percentage of consumers that have been exposed to the topic on all the unaffiliated websites increasing and/or decreasing respectively over a period of time. Trend report 402 provides get benefit by allowing a publisher to graphically see the trend of a certain topic. Recognizing the upward and/or downward trend of a topic gives the publisher an advantage of knowing what additional and/or different content is necessary to fulfill consumers' needs. The publisher trend 402a and the global reach trend 402b are examples of an aggregated result. The trend report 402 is an example of a comparison result between the publisher trend 402a and the global reach trend 402b. While not depicted explicitly in the exemplary interfaces, one skilled in the art could appreciate other informational representations. For example, instead of a graphical representation, a percentage could be shown to inform the publisher how much consumer traffic a particular topic is receiving compared to other unaffiliated websites reporting on the same topic.

Referring back to FIG. 4, chart 404 includes a list of consumer search queries that were gathered and stored as metadata in the content database 124, a global frequency percentage, a my referrers number, and a change percentage. The global frequency percentage refers to:

$$\frac{\left(\begin{array}{c}\text{Number of Times The Consumer Search Query Was}\\ \text{Entered Across A Single Website}\end{array}\right)}{\left(\begin{array}{c}\text{Number Of Times The Consumer Search Query Was}\\ \text{Entered Across All Unaffiliated Websites}\end{array}\right)}$$

The my referrers number refers to the total number of times the consumer search query was entered for a specific publisher's website. The change percentage refers to the percentage increase and/or decrease of consumer search queries over a period of time. In other embodiments, the consumer search queries listed in chart 404 may not be topic specific. Instead, the listing of consumer search queries could be a top 10 listing of the most popular consumer search queries that were used when searching other domains (e.g., search engines). For example, some of the information that is stored in the content database 124 includes a consumer search query for "Obama" executed on the GOOGLE® search engine. This consumer search query is included because once the search is executed and the consumer then navigates to a publisher's website, the consumer's navigation is tracked and reported to system 100. Again with this consumer search query information, a publisher sees what top search queries are being entered by consumers of all unaffiliated websites. The top search queries also indicate demand and success of search engine optimization measures. Furthermore, with this information, a publisher may then adjust the amount of content regarding the topics associated with those top search queries and/or actions may be taken to better promote existing content based on the search queries that consumers are entering into search engines. The listing of consumer search queries is considered another example of an aggregated result. In yet other embodiments, chart 404 consists of a top domains column along with usage percentage column again without being topic specific. A domain represents a web property typically operated by a publisher or other entity (e.g., nytimes.com, reuters.com, google.com). A domain may be a search engine, a publisher's web site, and/or a social aggregator. For example, the top domain column lists GOOGLE®, BINGO, nytimes.com, drudgereport.com as the top four domains for consumer search queries and lists the corresponding usage percentage (i.e., percentage of consumer search queries that initiated from a given domain). In addition, this representation may be displayed for only the search queries that result in a navigation to publisher A's website or for all search queries that result in a navigation to all publishers' websites. Either way, this representation allows a publisher to see which domains are effective at navigating consumers to websites. Thus, the publisher may consider focusing its resources on the most effective domain(s) for its content. The listing of top domains and/or the usage percentage are considered additional examples of an aggregated result.

The last chart representation in FIG. 4 is the headline chart 406 which depicts a listing of publisher headlines/articles related to the topic, the pageviews number (i.e., the number of times publisher's webpages concerning the topic have been exposed to a consumer) and the change percentage increase and/or decrease in webpage/article exposure over a period of time. The global frequency number, the my referrers number, my pageviews number and the change percentage are each examples of an aggregated result. In addition, any combination of the global frequency number, the my referrers number, my pageviews number and the change percentage is also an aggregated result.

FIG. 5 also illustrates a chart representation similar to chart representation 404 with the distinction that FIG. 5 has different consumer search queries with potentially no relation to each other. For example, chart 404 has a list of consumer search queries relating to Prince William and Kate Middleton's royal wedding. While FIG. 5 does have a topical listing for Greece and Greek default, the other two consumer search queries are not related to topics of Greece and Greek default. This representation assists a user that wants an idea of what consumers across the multiple unaffiliated websites are searching along with the trends (i.e., change percentage) relating to those consumer search queries.

FIG. 6 depicts another chart representation where topics are listed along with global reach percentage, my pageviews number and change percentage. Global reach percentage refers to the percentage of consumers that have been exposed to the topic on all the unaffiliated websites. My pageviews number is the number of times publisher's webpages concerning the topic have been exposed to a consumer. The change percentage refers to the percentage increase and/or decrease of topic exposure over a period of time. The global reach number is also an example of an aggregated result.

Additionally, while not explicitly shown in the exemplary interfaces, in some exemplary embodiments, the representations in FIGS. 4-6 have the capability to be segmented geographically or by publisher type. For example, in FIG. 6 there is a listing of four topics. A user could segment these topics, for instance, by searching only for topics that affect North America or the financial news segment.

After a publisher has assessed the aggregated result and/or comparison result, the publisher may recognize the need for providing its consumers additional information regarding a topic because there is an increase in overall traffic to websites with that specific topic. In addition, a publisher may recognize that it does not provide any information on a specific topic that is showing an increase in other websites. To that end, in some embodiments, aggregating a set of analyzed webpage portions from at least two unaffiliated websites occurs wherein the set of analyzed webpage portions is associated with a plurality of third parties (e.g. a plurality of publishers). Then an aggregated result associated with an aggregated set of analyzed webpage portions from the at least two unaffiliated websites gets transmitted. Finally, a set of content is recommended wherein the set of content is associated with the aggregated result. For example, publisher A does not provide any information on the Chilean mine disaster but realizes while looking at the top 10 search queries chart (e.g., aggregated result) that "Chilean mine disaster" is the top search query. Publisher A sees the aggregated result associated with an aggregated set of analyzed webpage portions and the set of analyzed webpage portions are associated with a plurality of third parties. In this instance, the plurality of third parties does not include publisher A because it does not provide any information on the Chilean mine disaster. However, publisher A may, nonetheless, take advantage of the aggregated result by supplementing Chilean mine disaster content to its consumer, in order to see an increase in website traffic. Taking the advantage includes recommending a set of content to publisher A (i.e., a third party), for example, through a pop-up window asking if the publisher would be interested in buying/licensing a set of content. This set of content may be related to one specific topic and/or several topics may be bundled according to publisher A's content needs.

In other embodiments, aggregating a first set of analyzed webpage portions associated with a first website and aggregating a second set of analyzed webpage portions associated with at least one second, unaffiliated website occurs, in response to receiving a query. The first set of analyzed webpage portions is associated with a first third party from a plurality of third parties, and the second set of analyzed webpage portions is associated with a second third party from the plurality of third parties. Then an aggregated first set of analyzed webpage portions and an aggregated second set of analyzed webpage portions are compared and a comparison result associated with the aggregated first set of analyzed webpage portions and the aggregated second set of analyzed webpage portions is transmitted. Finally, a set of content is recommended wherein the set of content is associated with the comparison result. For example, publisher Z may have one webpage article designated to the Chilean mine disaster. However, after assessing a comparison result between publisher Z and other publishers regarding the Chilean mine disaster, publisher Z realizes that it needs more content/information to provide to its consumers. Publisher Z sees the comparison result associated with an aggregated first set of analyzed webpage portions, the first set of analyzed webpage portions being associated with a first third party from a plurality of third parties, and the aggregated second set of analyzed webpage portions, the second set of analyzed webpage portions being associated with a second third party from the plurality of third parties. In this instance, publisher Z is considered a third party in the plurality of third parties. Publisher Z could be either the first third party or the second third party in this example. Therefore, publisher Z may take advantage of the comparison result by adding or supplementing the Chilean mine disaster content to increase publisher Z's website traffic. Moreover, a set of content is recommended to publisher Z (i.e., a third party), for example, through a pop-up window asking if the publisher would be interested in buying/licensing a set of content. This set of content may be related to one specific topic and/or several topics may be bundled according to publisher Z's content needs.

Either way, additional embodiments may establish a monetary amount for a distribution of the set of content. After publisher A has determined what content is needed, a monetary amount (i.e., price) is established for the set of content. Various pricing structures are known to those skilled in the art. For example, a one-time price could be established for the set of content. As another example, a monthly licensing fee could be established for the various sets of content.

The embodiments described above and in the claims are intended only to illustrate and teach one or more ways of practicing or implementing the present invention, not to restrict its breadth or scope. For example, while first and second sets of analyzed webpage portions, aggregated sets of analyzed webpage portions and/or third parties are discussed throughout, one skilled in the art appreciates that 'n' sets of analyzed webpage portions, aggregated sets of analyzed webpage portions and/or third parties may be used in the systems, methods and interfaces described herein. Another example, the storage module 140c may not be stored within the webpage consumption program 140 but instead stored within the content database 124. Any location within the memory 122 where data can be temporarily and/or permanently stored is acceptable as the computer bus 102 enables the components within the memory 122 to communicate. Another example, FIG. 1 shows browser 1383 and display 1381 as having the ability to display simultaneously; however, in operation, some embodiments may present them at separate times. The actual scope of the invention, which embraces all ways of practicing or implementing the teachings of the invention, is defined by the claims and their equivalents.

The invention claimed is:

1. A method comprising:
    receiving one or more indications of an occurrence of one or more browser events;
    determining, whether one or more webpage portions associated with the one or more browser events are to be analyzed for topic association, based on one or more temporal factors and textual characteristics associated with the one or more webpage portions, said temporal factors comprising a determination as to whether the one or more web page portions have been processed within a given time frame;
    analyzing the one or more webpage portions associated with the browser event where it is determined that the one or more webpage portions are to be analyzed, said analyzing comprising downloading a webpage portion from at least one website, extracting a text portion from the webpage portion and associating, in response to extracting the text portion, at least one topic from the text portion;
    storing the one or more analyzed webpage portions and the one or more indications of an occurrence of the one or more browser events in a database;
    aggregating, in response to receiving a query, a first set of analyzed webpage portions associated with a first website and a second set of analyzed webpage portions associated with at least one second, unaffiliated website, wherein the aggregated first set of analyzed webpage portions is associated with a set of publisher-specific metadata and the aggregated second set of analyzed webpage portions is associated with a set of anonymous metadata;
    comparing the aggregated first set of analyzed webpage portions and the aggregated second set of analyzed webpage portions;
    generating a comparison result, comprising the aggregated first set of analyzed webpage portions and the aggregated second set of analyzed webpage portions in response to the comparison;
    generating a set of recommended content associated with the comparison result; and
    transmitting the comparison result and the set of recommended content in response to the query.

2. The method of claim 1 wherein the set of analyzed webpage portions is associated with a topic.

3. The method of claim 1 wherein the text portion comprises a media content portion.

4. The method of claim 1 wherein the first set of analyzed webpage portions and the second set of analyzed webpage portions are associated with a topic.

5. The method of claim 1 wherein the set of publisher-specific metadata comprises at least one of a byline, an access device identifier, a publisher-defined section name, a webpage uniform resource locator (URL), a webpage title, an account identifier, and a consumer navigation tracker.

6. The method of claim 1 wherein the set of anonymous metadata comprises at least one topic, wherein the at least one topic is determined from a text portion of a webpage portion.

7. The method of claim 1 wherein the temporal factors comprises seconds, minutes, hours, days, or weeks.

8. The method of claim 1 wherein the textual characteristics comprises length of text, amount of text, ratio of text to multimedia files, or continuity of the text.

9. A system comprising:
    a processor;
    a memory coupled to the processor;
    a webpage consumption program stored in the memory for execution by the processor, the webpage consumption program comprising:
        a browser event collection module, the browser event collection module configured to:
            receive one or more indications of an occurrence of one or more browser events; and
            determine, whether one or more webpage portions associated with the one or more browser events are to be analyzed for topic association, based on one or more temporal factors and textual characteristics associated with the one or more webpage portions, said temporal factors comprising a determination as to whether the one or more webpage portions have has been processed within a given time frame;

an analysis module, the analysis module configured to analyze the one or more webpage portions associated with the browser event where it is determined that the one or more webpage portions are to be analyzed, said analyzing comprising downloading a webpage portion from at least one website, extracting a text portion from the webpage portion and associating, in response to extracting the text portion, at least one topic from the text portion;

a storage module, the storage module configured to store an analyzed webpage portion and the indication of an occurrence of the browser event in a database, the analyzed webpage portion being a webpage portion in the set of analyzed webpage portions;

an aggregation module, the aggregation module configured to aggregate, in response to receiving a query, a first set of analyzed webpage portions associated with a first website and a second set of analyzed webpage portions associated with at least one second, unaffiliated website, wherein the aggregated first set of analyzed browser events is associated with a set of publisher-specific metadata and the aggregated second set of analyzed browser events is associated with a set of anonymous metadata;

a comparison module responsive to the aggregation module, the comparison module configured to compare an aggregated first set of analyzed webpage portions and an aggregated second set of analyzed webpage portions to generate a comparison result comprising the first set of analyzed webpage portions and an aggregated second set of analyzed webpage portions and generate a set of recommended content associated with the comparison result; and a transmission module, the transmission module configured to transmit the comparison result and the set of recommended content in response to the query.

10. The system of claim 9 wherein the set of analyzed webpage portions is associated with a topic.

11. The system of claim 9 wherein the text portion comprises a media content portion.

12. The system of claim 9 wherein the first set of analyzed webpage portions and the second set of analyzed webpage portions are associated with a topic.

13. The system of claim 9 wherein the set of publisher-specific metadata comprises at least one of a device identifier, a webpage URL, a webpage title, an account identifier and a consumer navigation tracker.

14. The system of claim 9 wherein the set of anonymous metadata comprises at least one of a device identifier, a webpage URL, a webpage title, and a consumer navigation tracker.

15. The system of claim 9 wherein the temporal factors comprises seconds, minutes, hours, days, or weeks.

16. The system of claim 9 wherein the textual characteristics comprises length of text, amount of text, ratio of text to multimedia files, or continuity of the text.

\* \* \* \* \*